3 Sheets—Sheet 1.

C. B. COTTRELL.

PRINTING-PRESSES.

No. 7,009. Reissued March 21, 1876.

Witnesses:
E. Wolff.
Jacob Felbel

Inventor:
C. B. Cottrell
By atty. J. N. McSulive

N. PETERS, PHOTO-LITHOGRAPHER, WASHINGTON, D. C.

3 Sheets—Sheet 2.

C. B. COTTRELL.

PRINTING-PRESSES.

No. 7,009. Reissued March 21, 1876.

Witnesses:
E. Wolff.
Jacob Felbel

Inventor:
C. B. Cottrell
By atty. J. Mac Pulin

N. PETERS, PHOTO-LITHOGRAPHER, WASHINGTON, D. C.

C. B. COTTRELL.

PRINTING-PRESSES.

No. 7,009. Reissued March 21, 1876.

Witnesses:
C. Wolff.
Jacob Felbel

Inventor:
C. B. Cottrell.
By his atty. J. Mac Intire

N. PETERS, PHOTO-LITHOGRAPHER, WASHINGTON, D. C.

UNITED STATES PATENT OFFICE.

CALVERT B. COTTRELL, OF WESTERLY, RHODE ISLAND.

IMPROVEMENT IN PRINTING-PRESSES.

Specification forming part of Letters Patent No. 167,227, dated August 31, 1875; reissue No. 7,009, dated March 21, 1876; application filed March 2, 1876.

*To all whom it may concern:*

Be it known that I, CALVERT B. COTTRELL, of Westerly, in the county of Washington and State of Rhode Island, have invented a new and useful Improvement in Printing-Presses, of which the following is a full, clear, and exact description, reference being had to the accompanying drawings, making part of this specification.

My invention relates to that kind of machines known as stop-cylinder presses, and consists in certain hereinafter-described improvements in the construction of such machines, by which they are rendered capable of more efficiently performing the operations of "double rolling" and running the bed any greater number of times while the cylinder remains motionless, and by which the stopping, starting, and retention of the cylinder are effected with more certainty and less strain and jar to the machine than heretofore.

Figure 1:
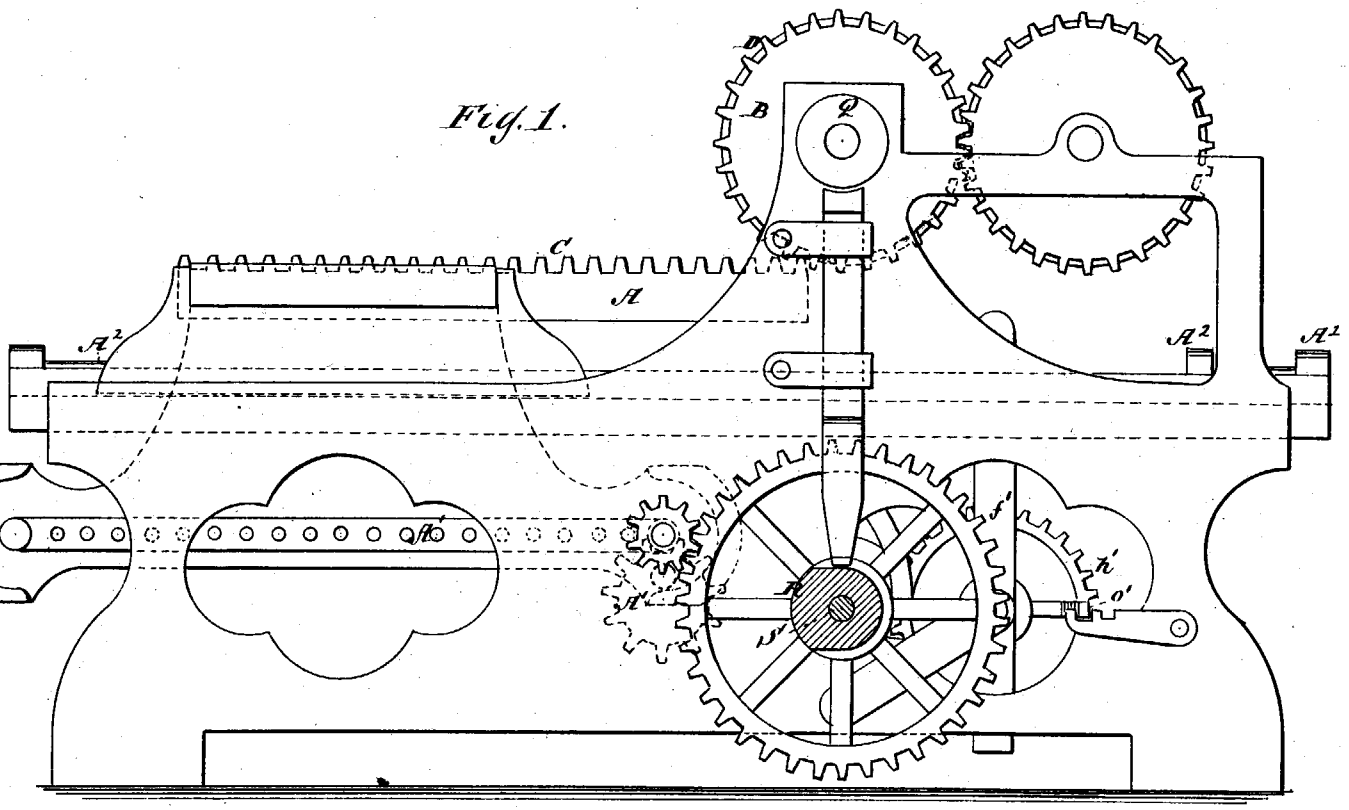
Figure 2:
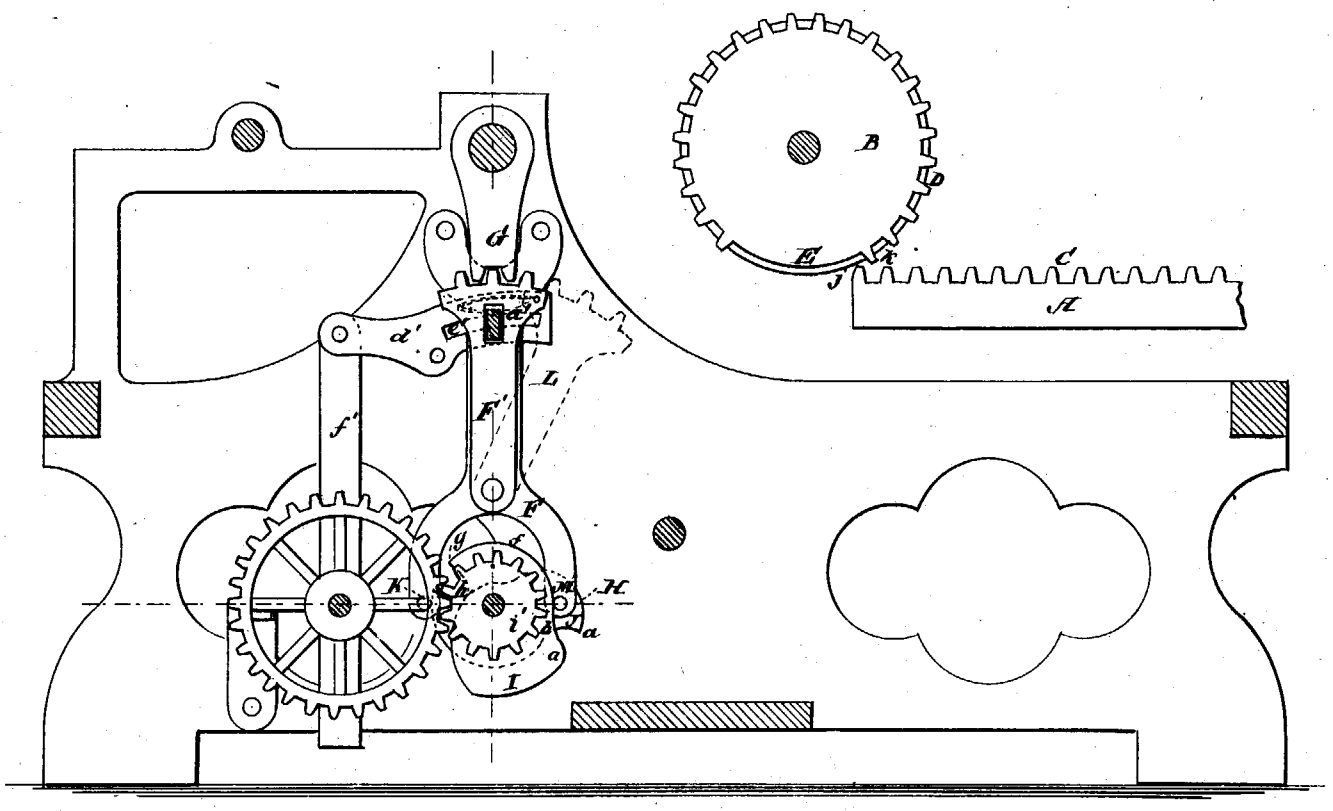
Figure 4:
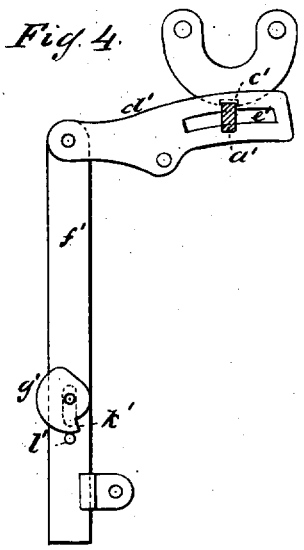
Figure 5:
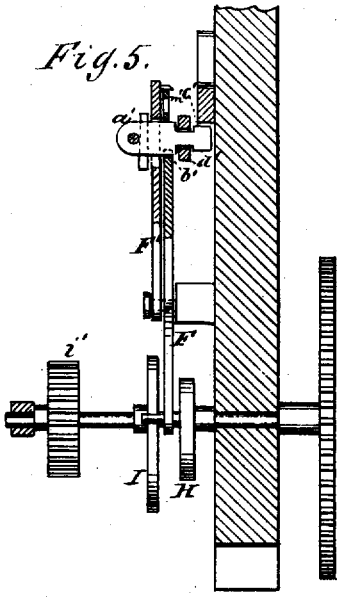
Figure 6:
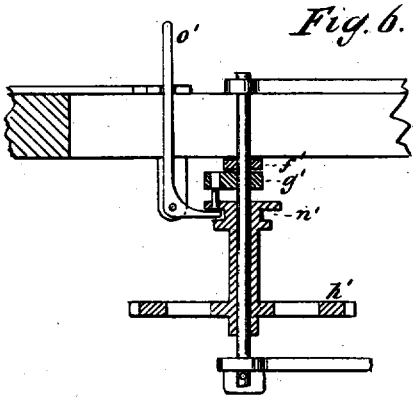
Figure 7:
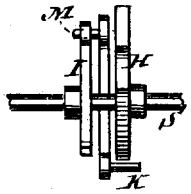
Figure 3:
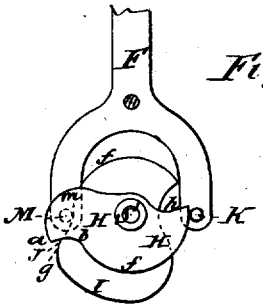

In the accompanying drawing, Figure 1 is a side elevation of a stop-cylinder printing-press embodying my invention. Fig. 2 is a longitudinal sectional elevation of the same, but with the bed and cylinder displaced from their proper location in the machine, in order that other parts of the mechanism may be presented to view. Fig. 3 is a side view of the cams and the rocking bar or lever used for stopping and starting the cylinder, presenting the side opposite to that seen at Fig. 2. Fig. 4 is a detail side view of a portion of the double-rolling mechanism. Fig. 5 is a sectional elevation of the mechanism for effecting the double rolling. Fig. 6 is a detail horizontal section of the contrivance or mechanism employed to effect at pleasure the connection or disconnection of the double-rolling gear and driving-gear, and Fig. 7 is a bottom view of the devices seen in elevation at Fig. 3.

In the several views the same part will be found designated by the same letter of reference.

In the machine shown, the construction is such that the bed travels at its maximum speed at the times when it becomes disengaged from and re-engaged with the cylinder, and to carry out this principle of operation I drive the bed A by the well-known contrivance of a double rack and tumbling-pinion, as seen at $A^1$, but this mode of operation and the means employed not being peculiar to or forming any part of my present invention, need no further remark here. I have also shown in the drawings spring-pistons $A^2$, located near each end of the main frame, which work in cylinders arranged on the ends of the bed in such a manner as to form air-cushions or bumpers for checking the momentum of the bed A at the end of each stroke, but as such contrivance is fully set forth in and forms the subject-matter of a prior patent to me, I need not herein further describe it. The bed A rotates or turns the cylinder B by means of a rack, C, on said bed, and a toothed wheel, D, on said cylinder, and the said rack and gear run out of engagement to permit the stoppage of the cylinder during the retrograde movement or stroke of the bed, by reason of a blank or toothless portion, E, of gear D, in the usual manner. In order to stop the cylinder, which runs very fast, quickly, and without shocks and noise, and without slowing the bed, and to start it and connect with the rack in the same manner, I employ the crotched segmental two-part lever F F′, a toothed segment, G, on the cylinder and the cams H and I, the cam H having a very carefully graduated part, J, whereon it catches the roller K of the segmental lever F, just before the rack disconnects from the cylinder, which takes place at the end of the movement of the bed to the left, and slow it down to a complete stop, while the part of the cam from *a* to *b* passes the roller, the segment F being previously turned forward to the right, as indicated by the dotted lines L, by the part *m* of cam H, to engage the cylinder just before the rack disengages from it. The cylinder then rests in the position represented in Fig. 2 until the bed goes back to the right, during which time the circular parts *f* of both of the cams pass the rollers K and *m* without moving the segmental lever F, thereby locking the cylinder and holding it to receive the paper.

When the bed is ready to run back again under the cylinder, and the rack to engage with wheel D, the cams will have turned so that roller M will be thrown forward to the right and the segment to the left by the part *g* of cam I, and roller K will drop into depressions *h* of cam H, which will start the cylinder, so that tooth *j* of the rack C will engage notch *k* of wheel D, and thus connect the rack and the cylinder. This cam I is also very carefully graduated in the part *g*, so that it works in unison with the rack for a short time at the starting, and after the rack and cylinder are engaged, and sustains the principal strain of quickly starting the cylinder, and gradually delivers it to the rack in the way to avoid a shock. The cam then simply allows the segment to run far enough with the cylinder to escape from segment G; then the part *m* of cam H throws the segment forward again to the right, to be ready to catch the cylinder just before the rack escapes from it, as before, after which the operations will be in repetition of those above described.

This combination or arrangement of devices I have found to work very successfully in the kind of press shown, (in which the cylinder is run at the maximum speed of the bed, and may be worked as fast as the composition-rollers will bear to be run,) and it permits of a ready adjustment of the machine to do double rolling, or to be run the bed any number of times without moving the cylinder.

I have made the segmental lever, as already described, in two parts, F F′, and provided the catch *a′* in the part F′ for locking the two parts together when the cylinder is to be put in gear by dropping into the notch *b′* in the top of part F′, and lifting out of said notch when they are to be disconnected, and also for locking part F′ to the frame to hold the cylinder in position while the part F is kept in motion by the cams by rising up into a notch in plate *c′* on the frame; and for working this catch I have provided a rock-lever, *d′*, and connected it to the catch by a slot, *e′*, to allow the catch to move along the lever as the segment swings when the two parts are connected, and have connected this lever to the rod *f′*, which, being depressed by the cam *g′*, which gears with the cam-shaft S by wheel *h′* and pinion *i′*, so as to have one motion to two of the cam-shaft, will, at each alternate movement of the cam-shaft S and bed, disconnect the cylinder, and allow it to stand during one revolution of the press; then, as the part *k′* of the cam passes the stud-pin *l′*, the spring *m′* will press the catch *a′* into the notch of part F′ of the segmental lever, and thus gear the cylinder with the bed again. The cam *g′* is put in or out of gear with the cam-shaft S by the clutch *n′* attached to wheel *h′*, and has a lever, *o′*, for shifting it.

Having so fully described the construction and operation of my improved stop-cylinder-press that any skilled person can make and use my invention, and wishing to be understood as making no claim herein, broadly, to the combination with the cylinder of means for gradually starting and stopping said cylinder, as described, since such broad invention constitutes the subject-matter of an application for separate Letters Patent.

What I claim in this application, and desire to secure by Letters Patent, is—

1. The combination of the locking-catch *a′*, with the divided segmental lever F F′ and rock-lever *d′*, substantially as specified.

2. The segmental lever composed of two parts, F F′, and a locking-catch, *a′*, in combination with rock-lever *d′* and notched plate *c′*, arranged to lock and unlock said parts, and also to lock the part F′, which gears with the cylinder, to the frame, when disconnected from part F, all substantially as specified.

Witness my hand and seal.

C. B. COTTRELL. [L. S.]

In presence of—

J. N. McINTIRE,
JACOB FELBEL.